United States Patent
Nakayama

(10) Patent No.: US 9,678,625 B2
(45) Date of Patent: Jun. 13, 2017

(54) MULTIMEDIA PLAYER AND MENU SCREEN DISPLAY METHOD

(75) Inventor: Ryuji Nakayama, Tokyo (JP)

(73) Assignees: SONY CORPORATION, Tokyo (JP); SONY INTERACTIVE ENTERTAINMENT INC., Tokyo (JP)

(*) Notice: Subject to any disclaimer, the term of this patent is extended or adjusted under 35 U.S.C. 154(b) by 629 days.

(21) Appl. No.: 13/614,374

(22) Filed: Sep. 13, 2012

(65) Prior Publication Data

US 2013/0014059 A1  Jan. 10, 2013

Related U.S. Application Data

(63) Continuation of application No. 11/996,521, filed as application No. PCT/JP2007/000440 on Apr. 23, 2007.

(30) Foreign Application Priority Data

May 3, 2006  (JP) .................. 2006-128749

(51) Int. Cl.
  *G06F 3/0482* (2013.01)
  *G11B 19/02* (2006.01)
  (Continued)

(52) U.S. Cl.
  CPC .......... *G06F 3/0482* (2013.01); *G11B 19/025* (2013.01); *G11B 27/34* (2013.01);
  (Continued)

(58) Field of Classification Search
  CPC ..... G06F 3/0482; G11B 19/025; G11B 27/34; G11B 2220/2562; H04N 21/4312; H04N 5/44543
  (Continued)

(56) References Cited

U.S. PATENT DOCUMENTS 5,680,558 A  10/1997 Hatanaka et al.
6,661,437 B1 * 12/2003 Miller ................. G06F 3/04817
                                                            348/E5.006
(Continued)

FOREIGN PATENT DOCUMENTS

EP  1494240  1/2005
EP  1783586  5/2007
(Continued)

OTHER PUBLICATIONS

Notification of Reason(s) for Refusal dated Jul. 23, 2013, from corresponding Japanese Application No. 2012-229526.
(Continued)

*Primary Examiner* — Sara England
(74) *Attorney, Agent, or Firm* — Katten Muchin Rosenman LLP

(57) ABSTRACT

A menu management unit relates items of contents received from a storage unit to multiple folder icons 120, which represent units for displaying contents. A menu screen generating unit generates image data for a menu screen 50, which includes a function icon array 70 formed by multiple function icons 52-62 aligned horizontally, and a folder icon array 72 formed by multiple folder icons 120 aligned vertically. With respect to each of the multiple folder icons, an effect processing unit receives, as a folder attachment image 122, one of content icons representing related contents from the storage unit, and then displays, in the folder icon array 72, the folder attachment image 122 and the folder icon 120 so that the folder attachment image is included in the semi-transparent folder icon superimposed upon the image.

11 Claims, 12 Drawing Sheets

(51) Int. Cl.
*G11B 27/34* (2006.01)
*H04N 5/445* (2011.01)
*H04N 21/431* (2011.01)

(52) U.S. Cl.
CPC ..... *H04N 5/44543* (2013.01); *H04N 21/4312* (2013.01); *G11B 2220/2562* (2013.01)

(58) Field of Classification Search
USPC ........................................................ 715/810
See application file for complete search history.

(56) References Cited

U.S. PATENT DOCUMENTS

| | | | |
|---|---|---|---|
| 6,910,191 B2* | 6/2005 | Segerberg et al. | 715/830 |
| 7,698,658 B2* | 4/2010 | Ohwa | G06F 3/0482 715/766 |
| 7,703,043 B2 | 4/2010 | Utsuki et al. | |
| 2003/0090524 A1 | 5/2003 | Segerberg et al. | |
| 2003/0156140 A1 | 8/2003 | Watanabe | |
| 2003/0169288 A1 | 9/2003 | Misawa | |
| 2004/0267793 A1 | 12/2004 | Sato | |
| 2005/0187943 A1 | 8/2005 | Finke-Anlauff et al. | |
| 2005/0228849 A1 | 10/2005 | Zhang | |
| 2005/0229111 A1* | 10/2005 | Makela | 715/802 |
| 2006/0020900 A1* | 1/2006 | Kumagai et al. | 715/767 |
| 2007/0083827 A1 | 4/2007 | Scott et al. | |
| 2008/0141172 A1 | 6/2008 | Yamamoto et al. | |
| 2008/0250043 A1 | 10/2008 | Sato | |

FOREIGN PATENT DOCUMENTS

| | | |
|---|---|---|
| JP | 07-160466 | 6/1995 |
| JP | 2000-276474 A | 10/2000 |
| JP | 2004-304619 | 10/2004 |
| JP | 2005-4419 | 1/2005 |
| JP | 2005-354245 | 12/2005 |
| JP | 2006-4292 | 1/2006 |
| JP | 2006-065368 A | 3/2006 |
| JP | 2006-94193 | 4/2006 |
| WO | 2005121932 | 12/2005 |

OTHER PUBLICATIONS

Decision of Refusal dated Jul. 17, 2012 from the corresponding Japanese Patent Application No. 2006-128749.
European Search Report dated Aug. 16, 2012, from corresponding European Application No. 12 16 5324.0.
Bott E., et al. "Table of Contents; Chapter 20: Windows Explorer for Experts—Putting Pictures on Folder Icons" Oct. 6, 2004, pp. 1-8, 669, Retrieved from : http://proquest.safaribooksonline.com/book/operating-systems/9780735642171 on Mar. 31, 2011.
Notification of Reason(s) for Refusal dated Oct. 4, 2011, from corresponding Japanese Application No. 2006-128749.
Notification of Reason(s) for Refusal dated Aug. 17, 2010, from the corresponding Japanese Application No. 2006-128749.
Supplementary European Search Report and Annex to the European Search Report, dated May 6, 2010 from corresponding European Application No. EP 07 73 7097.
International Preliminary Report on Patentability and the Written Opinion of the International Searching Authority dated Nov. 4, 2008, from the corresponding International Application No. PCT/JP2007/000440.
International Search Report dated May 29, 2007 from corresponding PCT/JP2007/000440, with partial translation.
U.S. Office Action dated Mar. 27, 2012 from the corresponding U.S. Appl. No. 11/996,521.
U.S. Office Action dated Feb. 16, 2011 from the corresponding U.S. Appl. No. 11/996,521.
U.S. Office Action dated Mar. 12, 2015 from corresponding U.S. Appl. No. 11/996,521.
U.S. Office Action dated Sep. 2, 2015, from the corresponding U.S. Appl. No. 11/996,521.

* cited by examiner

FIG.9

| CONTENT (SONG) | GENRE | ARTIST | ALBUM | YEAR |
|---|---|---|---|---|
| aaa | J-POP | A | α | 2004 |
| bbb | J-POP | A | β | 2004 |
| ccc | R&B | B | γ | 2000 |
| ddd | HipHop | C | δ | 2006 |
| eee | J-POP | D | ε | 1998 |
| fff | Country | E | ζ | 2002 |
| ggg | Country | F | ζ | 2002 |
| hhh | Country | F | ζ | 2002 |
| ... | ... | ... | ... | ... |

MULTIMEDIA PLAYER AND MENU SCREEN DISPLAY METHOD

TECHNICAL FIELD

The present invention relates to a multimedia player and a method of displaying a menu screen. More particularly, the present invention relates to a user interface technology for giving an instruction for multimedia playing.

BACKGROUND ART

In recent years, the variety of so-called digital home appliances has been increasing. To record a television program, for example, there can be used a hard disk recorder, a digital versatile disk (DVD) recorder, or a multifunction device combining the functions thereof. Also in playing music, various forms of music playing are now available besides playing ordinary compact disks (CDs), such as reproducing compressed data recorded in various kinds of memory cards or a hard disk.

DISCLOSURE OF INVENTION

Problem to be Solved by the Invention

Digital home appliances, particularly devices for playing images or music are expected to be used by multiple people at the same time. Accordingly, unlike personal computers (PCs), such devices are often placed in a living room or another shared space in a house. A control panel or a controller of a digital home appliance is usually designed with fewer buttons and a narrower display area. Therefore, items for control are sometimes displayed on a television screen or the like, which is separate from the appliance. Since one usually watches a television screen at some distance, small character strings or movement of a small pointer, as provided on a PC screen, is unsuitable for display on a television screen. Accordingly, favorable visual appearance and ease of operation are strongly desired in the user interface of a digital home appliance using a television screen. Particularly, non-PC users may not necessarily feel comfortable with methods of operation typically used for PCs.

It is also important in a multimedia player that the user interface does not much destroy a sense of a virtual world that a content provides to users.

The inventor has made the present invention on the basis of the recognition above, and a general purpose thereof is to provide to users an intuitive user interface in a multimedia player.

Means for Solving the Problem

One embodiment of the present invention is an apparatus capable of playing digital contents. The apparatus comprises: an operation unit which receives an instruction as to content playing via a user's operation; a storage unit which stores data of a plurality of function icons representing the types of content playing functions, contents, data of a plurality of content icons representing items of contents, and data of a semi-transparent folder icon representing a unit for displaying contents; a display output unit which outputs, to a display apparatus, image data of a menu screen related to the playing of a content, and which plays an item of a content received from the storage unit in accordance with a user's instruction received by the operation unit; and a display control unit which relates an item of a content received from the storage unit to one of the types of the content playing functions and a plurality of folder icons, and which generates image data for a menu screen including a first array in which a plurality of function icons are arranged on the screen, and a second array in which a plurality of folder icons are arranged on the screen. The display control unit receives, as a folder attachment image, one of content icons representing related contents from the storage unit, with respect to each of the plurality of folder icons, and then displays, in the second array on the menu screen, the folder attachment image and the folder icon so that the folder attachment image is included in the folder icon superimposed thereon.

The term "content" refers to information including moving images, still images, audio, texts and programs that are played, displayed or run by multiple types of information conveying means. The "content" may include information for entertainment purposes. While the term "content" refers to an abstract notion of what is played in general, the term "item of content" or "content item" may refer to an individual data file for moving image data, still image data, audio data, text data or program data as a content. The notion of "acquiring content items" may refer to acquiring of data such as a list of content names or file names as "content items". The term "playing" may refer to running of a program as well as playing of an image or audio.

Also, "semi-transparent" means that a user can visually recognize a folder attachment image displayed transparently beneath a folder icon, which is superimposed and displayed thereon.

According to this embodiment, a menu screen is configured so that a folder attachment image related to a content can be seen transparently beneath a semi-transparent folder icon. Accordingly, a user can intuitively understand that the user can view the item of the content by selecting the folder icon.

Another embodiment of the present invention is a method for displaying a menu screen using a content player. The method comprises: retrieving data of a plurality of function icons representing the types of content playing functions, contents, data of a plurality of content icons representing items of contents, and data of a semi-transparent folder icon representing a unit for displaying contents; relating an item of a retrieved content to one of the types of the content playing functions and a plurality of folder icons, and generating image data for a menu screen with a two-dimensional array including a first array in which a plurality of function icons are arranged in a particular direction on the screen, and a second array in which a plurality of folder icons are arranged in the direction intersecting the first array on the screen; and outputting, to a display apparatus, image data of a menu screen related to the playing of a content. In the generating, one of content icons representing related contents is received as a folder attachment image, with respect to each of the plurality of folder icons, and the folder attachment image and the folder icon are displayed in the second array on the menu screen so that the folder attachment image is included in the folder icon superimposed thereon.

Also in this embodiment, a user can intuitively understand that the user can view the item of the content by selecting the folder icon.

Advantageous Effects

The present invention provides to users an intuitive user interface in a multimedia player.

BRIEF DESCRIPTION OF THE DRAWINGS

FIG. 9 is a diagram that shows an example of content items and views related to the respective items.

Figure 1:
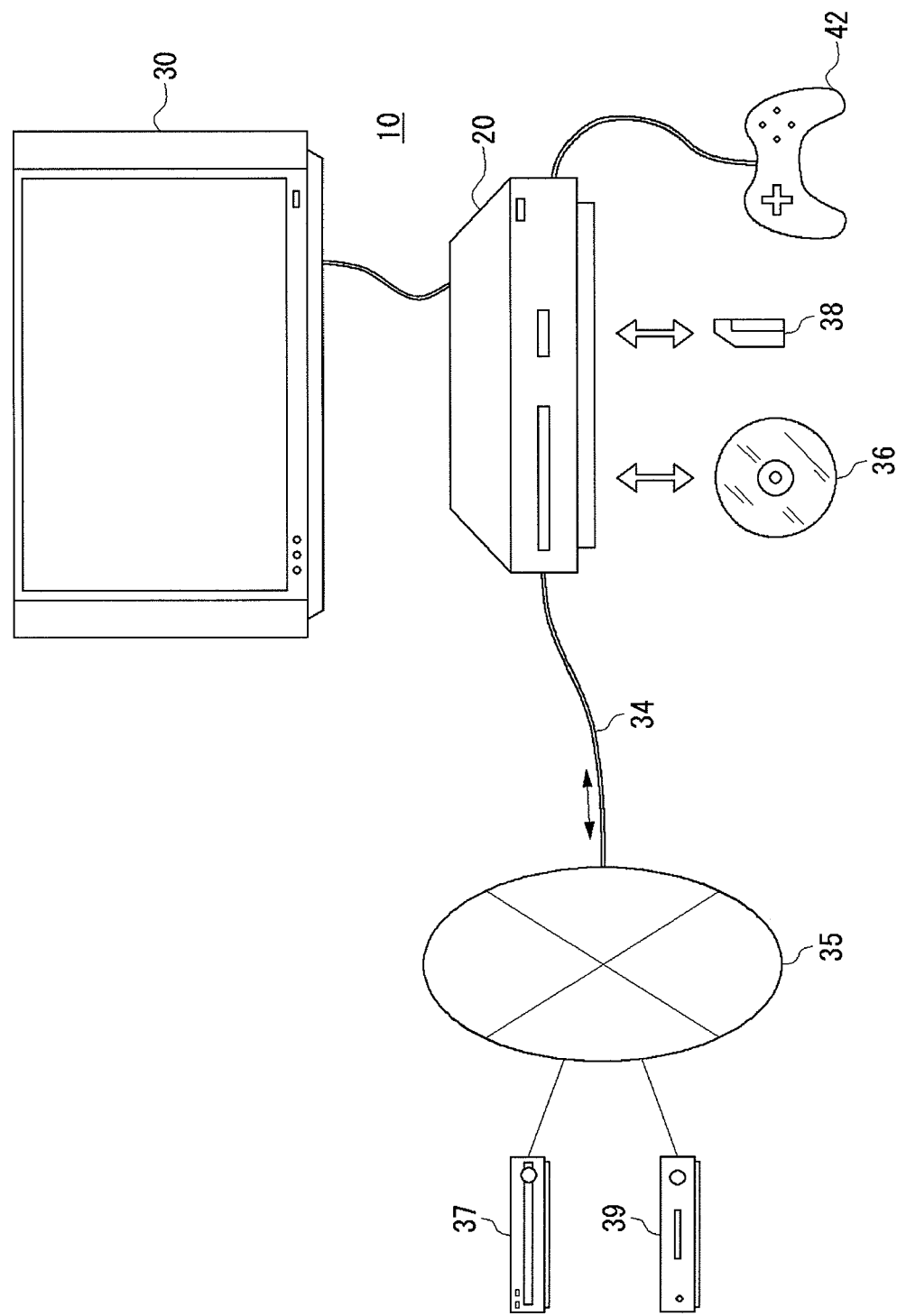
FIG. 1 is a diagram that shows the basic configuration of a multimedia playing system.

EXPLANATION OF REFERENCE NUMERALS 20 multimedia player
40 operation unit
46 display output unit
48 display control unit
50 menu screen
70 function icon array
72 folder icon array
78 content icon array
80 storage unit
96 playing screen generating unit
110 menu screen generating unit
112 background generating unit
120 folder icon
122 folder attachment image

BEST MODE FOR CARRYING OUT THE INVENTION

A multimedia playing system according to an embodiment of the present invention is a multifunction device capable of playing or running multiple types of contents such as still images, moving images, music, broadcast and games. The device is designed to use a screen of a television set as a display screen. To manipulate the device, a user uses items displayed on the screen and operation buttons on a controller. In order to play multiple contents on a PC, a viewer or another program dedicated to each content type needs to be used. Since such dedicated programs are generally provided by different vendors, the programs do not normally share a common interface. Accordingly, there is no unity among the methods of operation for the programs. Even if such programs were integrated under a common interface such as a portal screen, the result would be mere aggregation. Further, since the activation of each program requires more than a little time, users cannot comfortably switch between the programs.

A multimedia playing system according to the present embodiment integrates playing of multiple types of contents under a common interface, so as to offer unified operability to users. Also, it is assumed that a menu screen in the system provides three-dimensional space therein, and the system provides to users an intuitive user interface that makes the users feel as if they were making operation within the three-dimensional space. This enhances users' feeling of being immersed in the content's world.

FIG. 1 shows the basic configuration of a multimedia playing system. A multimedia playing system 10 functions with a multimedia player 20 as a key component. To the multimedia player 20 are connected a television set 30 and a controller 42. The television set 30, externally connected to the multimedia player 20, has a function of displaying or outputting images or audio output from the multimedia player 20. The controller 42 is a device for acquiring various instructions as to content playing via the user's operation, and functions as a part of the multimedia playing system 10. The controller 42 may be configured as a game controller as shown in FIG. 1, or, alternatively, as a remote controller used to control various functions provided by the multimedia player 20.

To the multimedia player 20, information is input via various recording media or various cables. For example, contents stored in external devices 37 and 39, which are connected to a LAN 35, are input to the multimedia player 20 via a network cable 34. The input contents are stored or buffered in the multimedia player 20 to be played.

The multimedia player 20 has functions of data reading and data writing with respect to an optical disk 36 including a DVD or a CD, and functions of data reading and data writing with respect to a detachable memory card 38. The multimedia player 20 may read data of movies or music albums from the optical disk 36, and may read data of captured images or videos from the memory card 38.

The multimedia player 20 displays on the television set 30 a menu screen for providing instructions as to content playing. On the menu screen, content items stored in the multimedia player 20 and content items stored in the external devices 37 and 39 are displayed. According to the user's instructions, each content can be played by the multimedia player 20.

Figure 2:
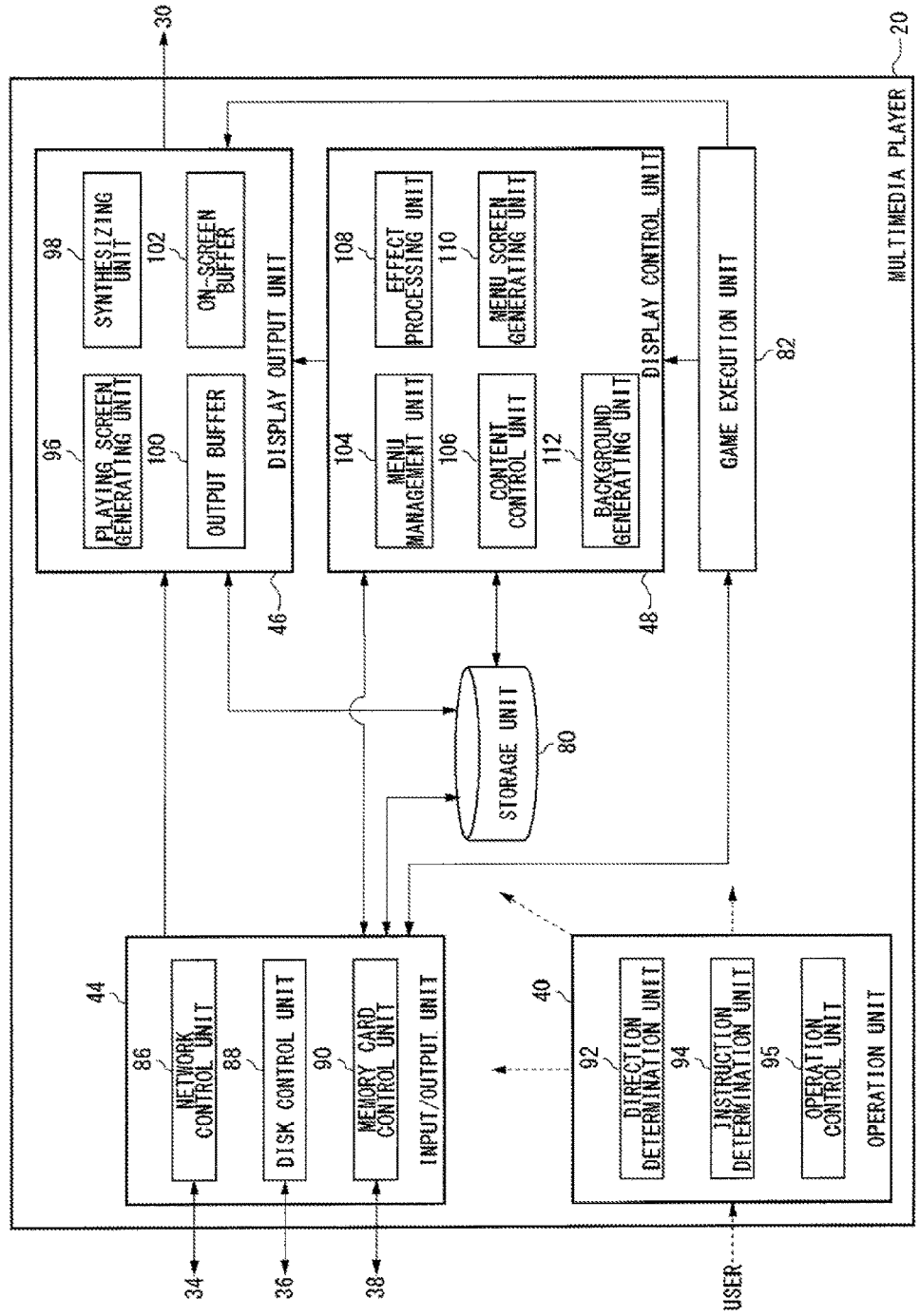
FIG. 2 is a functional block diagram that shows a configuration of a multimedia player.

FIG. 2 is a functional block diagram that shows a configuration of the multimedia player. The multimedia player 20 comprises an operation unit 40, an input/output unit 44, a display output unit 46, a display control unit 48, a storage unit 80 and a game execution unit 82. The multimedia player 20 can be implemented by configurations such as a CPU, a hard disk, a RAM, a ROM and a rendering circuit in terms of hardware, and by programs for providing various functions such as data input, data storage, image processing and rendering in terms of software. FIG. 2 illustrates functional blocks implemented by the cooperation of those components. Therefore, these functional blocks may be implemented in a variety of forms by combinations of hardware and software.

The operation unit 40 includes: a direction determination unit 92 which receives an instruction as to any of the four directions of up, down, left and right, provided via the user's operation on the controller 42; an instruction determination unit 94 which receives an instruction as to playing of a content, stopping of the playing, invoking of the menu screen or the like, provided via the user's operation on the controller 42; and an operation control unit 95 which controls the input/output unit 44, display output unit 46, display control unit 48 and game execution unit 82, according to the instructions received by the direction determination unit 92 and instruction determination unit 94.

The input/output unit 44 includes: a network control unit 86 which processes, via the network cable 34, input of contents stored in external devices or output of various data; a disk control unit 88 which controls input of data stored in the optical disk 36 or data writing into the optical disk 36; and a memory card control unit 90 which inputs or outputs data to or from the memory card 38. The network control unit 86 detects an external device connected to the LAN 35. The network control unit 86, disk control unit 88 and memory card control unit 90 receive information, including names of content items stored in the external devices 37 and 39, optical disk 36 and the memory card 38, data of icons corresponding to the content items, size of the data, etc., and store such information in the storage unit 80. The data input via the respective units constituting the input/output unit 44 will be transmitted to the display output unit 46, display control unit 48, storage unit 80 and game execution unit 82.

The storage unit 80 stores contents input from the external devices 37 and 39 via the network cable 34, contents such as music and movies loaded from the optical disk 36, and contents such as still images and moving images loaded from the memory card 38. The storage unit 80 further stores data of multiple function icons, which represent the types of playing functions, contents to be played by the display output unit 46 or contents to be executed by the game execution unit 82, data of multiple content icons, each of which represents respective content items stored in the storage unit 80, and data of semi-transparent folder icons, which represent units for displaying contents. Also, content icons representing content items stored in the external devices 37 and 39, optical disk 36 and memory card 38 are received by the network control unit 86, disk control unit 88 and memory card control unit 90, and stored in the storage unit 80. The function icons, content icons and folder icons are used to display items on the menu screen.

A function icon, a content icon or a folder icon may be an uncompressed image such as a bitmapped image, or may be a compressed image such as a JPEG image. Alternatively, such icons may be objects configured by mapping textures onto polygons. In the latter case, manipulating Z values can change the position in the direction of the screen vertical axis in the virtual three-dimensional space within the screen.

The display output unit 46 includes: a playing screen generating unit 96 which decodes and plays encoded data of a content; an output buffer 100 which temporarily stores playing data to be output to the television set 30; an on-screen buffer 102 which temporarily stores image data for on-screen display to be output to the television set 30; and a synthesizing unit 98 which synthesizes data of playing data and image data.

The playing screen generating unit 96 decodes encoded content data, such as movies or music, which is received from the input/output unit 44 or storage unit 80 according to the user's instructions received by the operation unit 40. Such decoded content data is then stored in the output buffer 100. The on-screen buffer 102 stores, as image data for on-screen display, image data for a menu screen and a background screen generated by the display control unit 48, for example. The synthesizing unit 98 synthesizes data of playing data stored in the output buffer 100 and image data for a menu screen and a background image stored in the on-screen buffer 102, and converts the synthesized data into an analog signal to output it to the television set 30.

The display control unit 48 includes: a menu management unit 104 which manages, as menu items, the types of playing functions and content items adaptable to the respective playing functions; a content control unit 106 which controls playing or execution of each content; an effect processing unit 108 which processes the operation of icons on a menu screen; a menu screen generating unit 110 which generates image data for a menu screen; and a background generating unit 112 which generates a background image displayed in the background of a menu screen or a playing screen.

The menu management unit 104 maintains a list of content items stored in the storage unit 80 and content items input via the input/output unit 44, and also memorizes a playing function and a content currently selected. The playing functions include, for example, functions of still image playing, music playing, moving image playing, broadcast display and game execution. Further, various setting functions and a network device selection function are also included therein. The menu management unit 104 also relates a content item to a type of a content playing function and multiple folder icons. The content control unit 106 controls, according to the user's instructions received by the operation unit 40, switching between playing functions, starting or stopping of content playing, data input via the input/output unit 44, data retrieval from the storage unit 80, and processing performed by the game execution unit 82.

The menu screen generating unit 110 generates a menu screen, which is configured with an array of multiple function icons aligned horizontally, and an array of multiple folder icons aligned vertically. These two arrays intersect each other near the center of the screen to form a cross array. The menu screen generating unit 110 highlights a function icon and a folder icon displayed at or near the intersection of the cross array, so as to visually distinguish such icons from the other icons. Further, with respect to each of the multiple folder icons, the menu screen generating unit 110 receives from the storage unit 80 one of content icons representing related contents, as a folder attachment image. The menu screen generating unit 110 then displays the folder attachment image and the folder icon so that the folder attachment image is included in the folder icon superimposed thereon.

The effect processing unit 108 performs processing as to scroll-displaying of arrays of function icons, folder icons and content icons, and highlighting of a function icon, a folder icon and a content icon to which attention is given. A highlighted icon is provided in a different format from the other icons, with, for example, displaying of the icon using different color and the change thereto, or the enlargement of the icon and the change thereto. The background generating unit 112 generates, as the background of a menu screen and a playing screen, a background image including a decorative object, which transforms within the virtual three-dimensional space provided in the screen.

The game execution unit 82 executes a game program read out by the disk control unit 88 from the optical disk 36, or a game program read out from the storage unit 80. The game execution unit 82 then performs processing as to the operation of the game program according to the user's instructions received by the operation unit 40, and transmits images and audio of the game to the display output unit 46.

Figure 3:
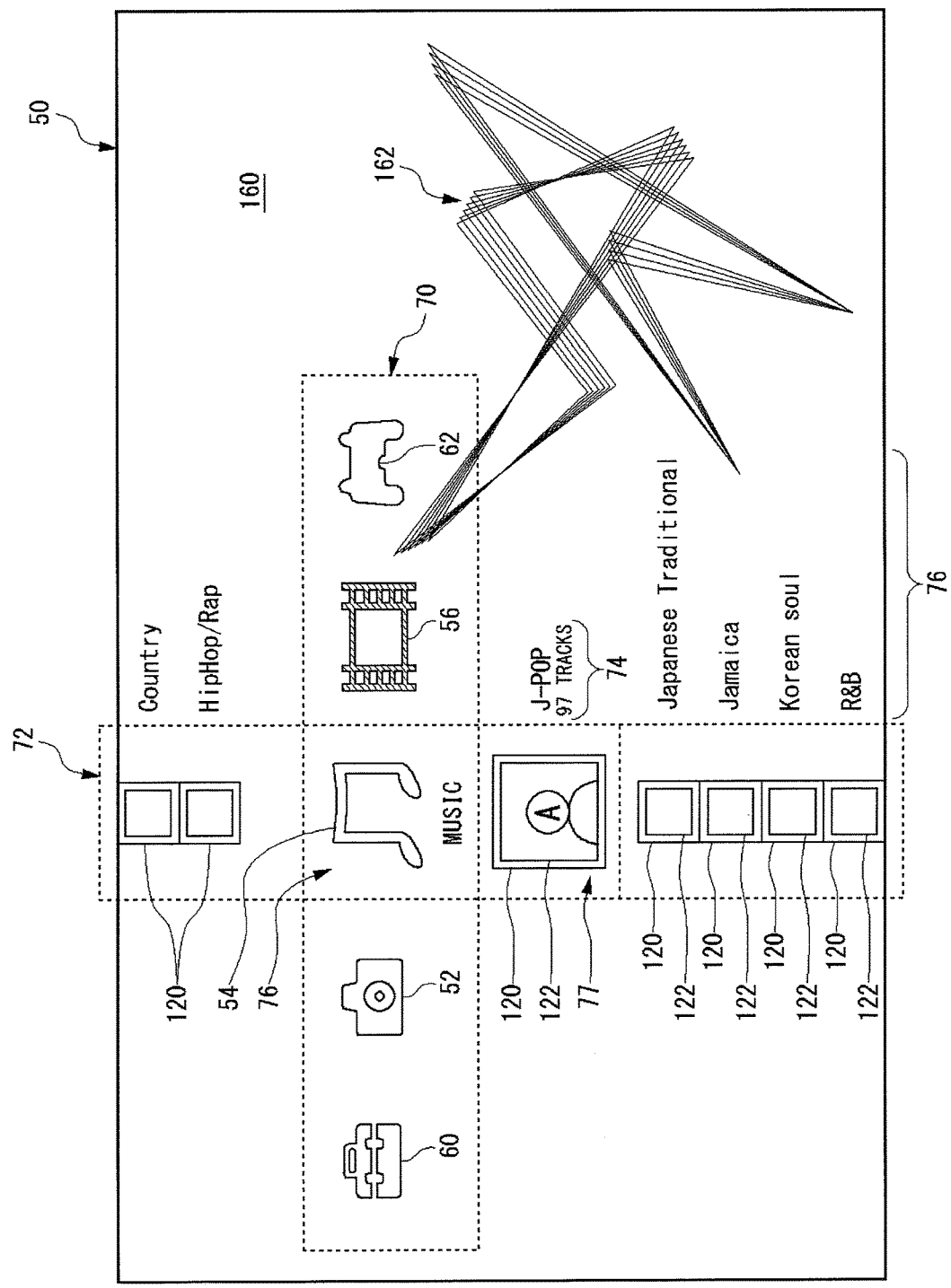
FIG. 3 is a diagram that shows a configuration of a menu screen generated by the multimedia player.

FIG. 3 shows a configuration of a menu screen generated by the multimedia player 20. A menu screen 50 displays a two-dimensional array in which a function icon array 70, which is formed by multiple function icons aligned horizontally, intersects a folder icon array 72, which is formed by multiple folder icons 120 and folder attachment images 122 aligned vertically. The function icon array 70 include a photo icon 52, a music icon 54, a moving image icon 56, a game icon 62 and a setting icon 60, which represent the types of playing functions provided by the multimedia player 20. The folder icon array 72 includes folder icons representing predetermined units for display, into which multiple contents in the storage unit 80 are divided to be displayed on the menu screen. The menu screen consisting of the function icon array 70 and folder icon array 72 is presented as an on-screen display superimposed upon a content image. When a content image currently reproduced is displayed in a background area 160, the effect processing unit 108 may color the whole area of the function icon array 70 and folder icon array 72 or may adjust the brightness of the content image, so that the arrays can be easily distinguished from the background image in appearance.

A folder icon 120 is texture data that represents an actual semi-transparent case of a CD or a DVD. A folder attachment image 122 is, for example, the content icon of a content that is positioned at the top when contents related to a folder icon are sorted by name. Alternatively, a user may select, from among content icons, the one to be displayed as a folder attachment image. A content icon is, for example, a thumbnail of a jacket image attached to a case.

A function icon positioned in the area where the function icon array 70 and the folder icon array 72 intersect (intersection area 76) is colored differently from the other function icons and enlarged as illustrated. The intersection area 76 is located at a predetermined position in the menu screen 50. According to the user's instruction via the operation unit 40, the entirety of the function icon array 70 moves left or right before the color and size of the function icon positioned in the intersection area 76 change. Thus, a user can select a desired playing function merely by specifying the lateral direction of left or right, and hence, a decision instruction such as a mouse click typically provided on a PC is unnecessary.

The effect processing unit 108 moves function icons left or right by scrolling the whole area of the function icon array 70 left or right. While the function icons are moved left or right, the effect processing unit 108 displays each of them with the same color and size but changes the color and size of only the function icon positioned in the intersection area 76. To change the color, the effect processing unit 108 may change such attributes of the function icon as the brightness, chroma and hue, or may display the icon flashing. In such way, since a function icon positioned in the intersection area 76 is displayed in a different display format from the other function icons, a user can select a medium easily.

When there is no function icon in the intersection area 76 while the function icons are moving left or right, the effect processing unit 108 does not display the folder icon array 72. When one of the function icons is positioned in the intersection area 76, the effect processing unit 108 may display the folder icon array 72 in a manner such that the array extends upward and downward from the intersection area 76, or may fade in the folder icon array 72 already extended on the menu screen 50. On fading in the extended folder icon array 72, blurred images of the icons in the array are gradually made clear. In other words, the intensity of a filter applied to the icons is gradually reduced with time. Also, if the folder icons and folder attachment images are objects configured by mapping textures onto polygons, the Z values of the polygons may be manipulated. By gradually increasing or decreasing the Z values of the polygons from the initial values, the extended folder icon array 72 will be displayed in such a manner as to move downward or upward from the front or back of the screen vertical axis to the level where the menu screen is defined. Also, by gradually increasing the α values of the textures from the initial values, the extended folder icon array 72 may be displayed in a manner such that the transparent array becomes opaque gradually. Further, the extended folder icon array 72 may be displayed in such a manner as to move from the right or left edge of the screen to the intersection area 76. The display methods stated above may be used in combination.

By merely scrolling the function icons left or right with the intersection area 76 as the target point, the user can recognize contents adaptable to the playing function. If an instruction as to the lateral direction is provided while the folder icon array 72 is displayed, the effect processing unit 108 may display the menu screen 50 in a converse manner such that the extended folder icon array 72 is withdrawn toward the intersection area 76, or may fade out the extended folder icon array 72 on the menu screen 50. Means used for a fade-out is the same as that for a fade-in.

An attention area 77 located near the center of the menu screen 50 is an area in which the user's target icon is displayed. The menu screen generating unit 110 displays the function icon array 70 so that the intersection area 76 is located near the attention area 77, or, more specifically, immediately above the attention area 77. The attention area 77 constitutes a part of the folder icon array 72.

When the operation unit 40 receives the user's instruction as to the longitudinal direction of up or down, each folder icon 120 and folder attachment image 122 is moved upward or downward according to the instruction. The effect processing unit 108 moves the folder icons 120 and folder attachment images 122 upward or downward by scrolling up or down the whole area of the folder icon array 72.

While folder icons 120 and folder attachment images 122 are moved upward and downward, the effect processing unit 108 displays each of them with the same color and size but enlarges only the folder icon and folder attachment image 122 positioned in the attention area 77, recognizing the icon as an attention icon. The effect processing unit 108 may also change such attributes of the attention icon as the brightness, chroma and hue, or may display the icon flashing. The other folder icons 120 and folder attachment images 122 are displayed smaller than the attention icon. Near the attention area 77, namely to the right thereof, is displayed folder information 74, which relates to a view of the folder icon 120.

The menu screen generating unit 110 displays the function icon array 70 slightly above the vertical center of the menu screen 50, and displays the folder icon array 72 slightly to the left of the horizontal center of the menu screen 50.

The photo icon 52 represents a still image playing function, so that the icon should be selected when a still image is played. An image to be played is a still image mainly captured by a digital camera, and the image is loaded from the memory card 38, for example. A folder attachment image 122 that is displayed when the photo icon 52 is located in the intersection area 76 is, for example, a thumbnail of a still image. When there is no image suitable for the folder attachment image, the photo icon 52 may be used instead. As the folder information 74, view information, such as "capture month" or "capture year" of a still image, "album", "alphabetical order" and "all photos", and the number of still images are displayed. Also, capture information including the capture date and the file size is displayed as content information.

The music icon 54 represents a music playing function, so that the icon should be selected when music data is played. Music data to be played is generated, for example, by encoding data loaded from the optical disk 36 in a specific compression format. A folder attachment image 122 that is displayed when the music icon 54 is located in the intersection area 76 is, for example, a thumbnail of a jacket image of a song distributed with music data by a vendor, or a thumbnail of a visual effect image generated from part of music data through a specific process. When there is no image suitable for the folder attachment image, the music icon 54 may be used instead. As the folder information 74, view information, such as "genre", "album", "artist", "recording year", "alphabetical order" and "all music", and the number of pieces of music data are displayed. Also, information including the song title, the album title and the playing time is displayed as the content information.

The moving image icon 56 represents a moving image playing function, so that the icon should be selected when a moving image is played. A moving image to be played is a recorded image captured by a digital video camera or an image read out from the optical disk 36 or an external device, which are encoded in a specific compression format. A folder attachment image 122 that is displayed when the moving image icon 56 is located in the intersection area 76 is, for example, a thumbnail of a jacket image distributed with a moving image by a vendor, or a thumbnail of a given frame of a moving image. The thumbnail may be a moving image. When there is no image suitable for the folder attachment image, the moving image icon 56 may be used instead. As the folder information 74, view information, such as "genre", "artist", "capture month" or "capture year" of a moving image, "alphabetical order" and "all images", and the number of moving images are displayed. Also, information including the title of the moving image, the recording date and the playing time is displayed as the content information.

The game icon 62 represents a game execution function, so that the icon should be selected when a game program is executed. An object to be executed is a game program stored in the storage unit 80 or a game program loaded from the optical disk 36. A folder attachment image 122 that is displayed when the game icon 62 is located in the intersection area 76 is, for example, a thumbnail of a jacket image distributed with a game program by a vendor, an icon representing a game program, a thumbnail of a given frame of a moving image provided in a game, or a thumbnail of an image of a game character. The thumbnail may be a moving image. When there is no image suitable for the folder attachment image, the game icon 62 may be used instead. As the folder information 74, view information, such as "genre", "alphabetical order" and "all programs", and the number of programs are displayed. Also, information including the title of the game program and the date when the program is installed is displayed as the content information.

The setting icon 60 represents various setting functions, so that the icon should be selected when each setting in the multimedia player 20 is changed.

In the background of a menu screen, a background image generated by the background generating unit 112 is displayed in a background area 160. The background generating unit 112 superposes a decorative object 162, which transforms within the virtual three-dimensional space in the screen according to a certain rule, and a background object occupying area other than the decorative object 162, so as to generate a single background image. The background generating unit 112 may generate a background image that transforms according to a certain condition, without using the decorative object 162.

Figure 4:
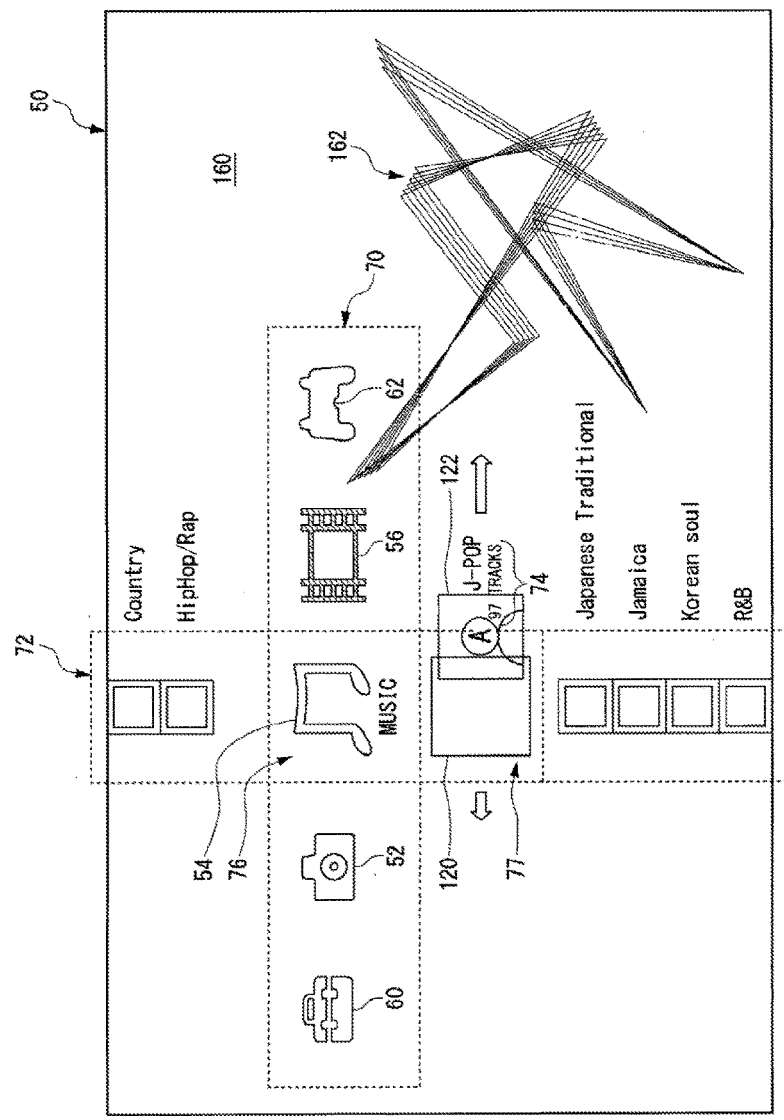
FIG. 4 is a diagram that schematically shows how the items on the menu screen change.

FIG. 4 schematically shows how the items on the menu screen 50 change. When the operation unit 40 receives the user's instruction as to folder selection in the state shown in FIG. 3, the effect processing unit 108 moves the folder attachment image 122, upon which the folder icon 120 is superimposed and displayed in the attention area 77, in a manner such that the image 122 is extracted from the icon 120 in the direction intersecting the folder icon array 72. In FIG. 4, the folder attachment image 122 is extracted to the right. While displaying the folder attachment image 122 moving to the right, the effect processing unit 108 also moves the function icon array 70 and folder icon array 72 slightly to the left maintaining the intersection of the both. The effect processing unit 108 may only move the folder attachment image to the right, without moving the function icon array 70 and folder icon array 72.

Figure 5:
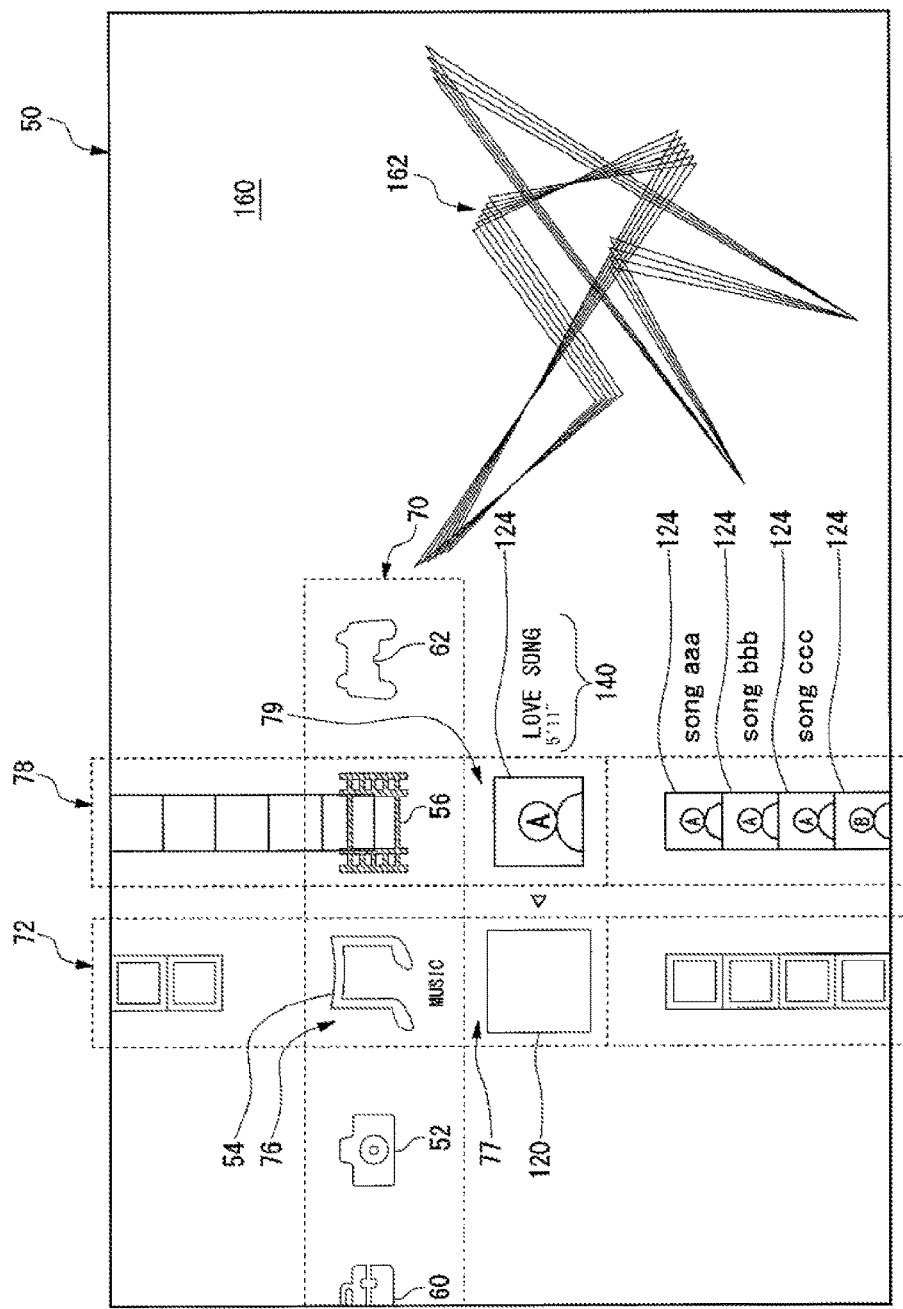
FIG. 5 is another diagram that schematically shows how the items on the menu screen change.

FIG. 5 shows a continuous change of the menu screen 50 starting from FIG. 3 and also shows the result of the user's instruction as to the selection of the folder icon 120. As shown in FIG. 5, since the function icon array 70 has been moved to the left, a part of the setting icon 60 is not displayed on the menu screen 50. Also, the attention area 77 is displayed away from the center of the menu screen 50 to the left. The folder attachment image 122 extracted from the folder icon 120 is positioned to the right of the attention area 77. Such position is newly defined as a second attention area 79.

To the right of the folder icon array 72 is arranged a content icon array 78. Content icons 124 that represent content items related to the folder icon 120 in the attention area 77 are received from the storage unit 80 and displayed on the menu screen 50. The content icon array 78 may be displayed, after the folder attachment image 122 is extracted to the right, in such a manner as to extend upward and downward from the second attention area 79. It is more preferable, however, if the content icon array 78, already extended parallel to the folder icon array 72, is faded in on the screen at a time when the folder attachment image 122 moves to the right. In the latter case, the time required to display the content icon array 78 can be reduced. In addition, since little movement occurs on the menu screen 50, the user's attention is less likely to be drawn thereto. Accordingly, the second attention area 79 becomes more likely to gather the user's attention.

By fading in the content icon array 78 extended upward and downward, blurred images of the icons in the array are gradually made clear. In other words, the intensity of a filter applied to the icons is gradually reduced with time. Also, if the content icons are objects configured by mapping textures onto polygons, the Z values of the polygons may be manipulated. By gradually increasing or decreasing the Z values of the polygons from the initial values, the extended content icon array 78 will be displayed in such a manner as to move downward or upward from the front or back of the screen vertical axis to the level where the menu screen is defined. Also, by gradually increasing the α values of the textures from the initial values, the extended content icon array 78 may be displayed in a manner such that the transparent array becomes opaque gradually. Further, the extended content icon array 78 may be displayed in such a manner as to move from the right or left edge of the screen to the right of the folder icon array 72. The display methods stated above may be used in combination.

At the stage shown in FIG. 5, the folder attachment image 122 extracted from the folder icon 120 is displayed as one of the content icons 124. It is because the folder attachment image 122 is originally a content icon selected from among content icons of contents related to the folder icon 120. When one of the content icons 124 is selected in the content icon array 78, the corresponding content item is played.

As with the icon in the attention area 77, the content icon 124 positioned in the second attention area 79 is also highlighted by the effect processing unit 108. When the operation unit 40 receives the user's instruction as to the longitudinal direction, the effect processing unit 108 moves the content icon array 78 upward or downward, and the content icon 124 located in the second attention area 79 is then highlighted. Further, to the right of the content icon 124, information 140 on the corresponding content item, such as the song title or the playing time, is displayed.

After or while the folder attachment image 122 is extracted from the folder icon 120 according to the user's instruction as to folder selection, the effect processing unit 108 may preferably display the function icons 52-62, folder icons 120 other than the folder icon selected by the user, and folder attachment images upon which the folder icons 120 are superimposed and displayed in the function icon array 70 and the folder icon array 72, with images acquired by applying a certain filter for making images indistinctive, instead of icons or images displayed before the selection of the folder icon. Such filter gives an effect of, for example, reducing the size of images, displaying images lighter by decreasing the luminance values of pixels, or making images blurred and unfocused. These effects may be used in combination. If such function icons, folder icons and folder attachment images are objects configured by mapping textures onto polygons, the objects may be made semi-transparent by decreasing the α values of the textures or may be moved toward the back of the screen vertical axis by manipulating the Z values, without applying a filter.

If a filter for making images indistinctive is applied to the function icons, folder icons and folder attachment images, images resulted therefrom may be used to replace the images displayed before the filter is applied, so as to generate a menu screen displayed after the folder icon is selected. Alternatively, a screen acquired by applying a filter for making images indistinctive to the entirety of the menu screen 50, which is generated by the menu screen generating unit 110 before the folder icon is selected, may be used as the menu screen displayed after the folder icon is selected.

In the example shown in FIG. 5, all the icons and folder attachment images in the function icon array 70 and folder icon array 72, except for the folder icon 120 in the attention area 77, are displayed smaller and lighter than those displayed before the folder icon 120 is selected, as shown in FIG. 4. With such display, icons that are not being selected by the user and need not to attract the user's attention at the time can be made indistinctive, thereby turning the user's attention to the second attention area 79. Meanwhile, to indicate that the function icon positioned in the intersection area 76 (the music icon 54 in FIG. 4) is currently selected, the size of the icon may be provided unchanged before and after the selection of the folder icon. Also, the function icon in the intersection area 76 and the folder icon in the attention area 77 may be displayed with reduced size, as with the other icons, after the folder icon is selected.

By displaying icons other than that selected smaller and unfocused upon the user's instruction as to folder selection, a visual effect can be also obtained as if the icons other than the selected icon moved toward the back of the screen vertical axis from the user's point of view. This makes the user feel as if the user were making menu operation within the three-dimensional space virtually provided in the menu screen 50, thereby enhancing the user's feeling of being immersed therein.

When the operation unit 40 receives the decision of playing a content that corresponds to the content icon 124 displayed in the second attention area 79, the menu screen generating unit 110 hides the image data of the menu screen, and the content control unit 106 provides control to start the playing of the selected content.

Figure 6:
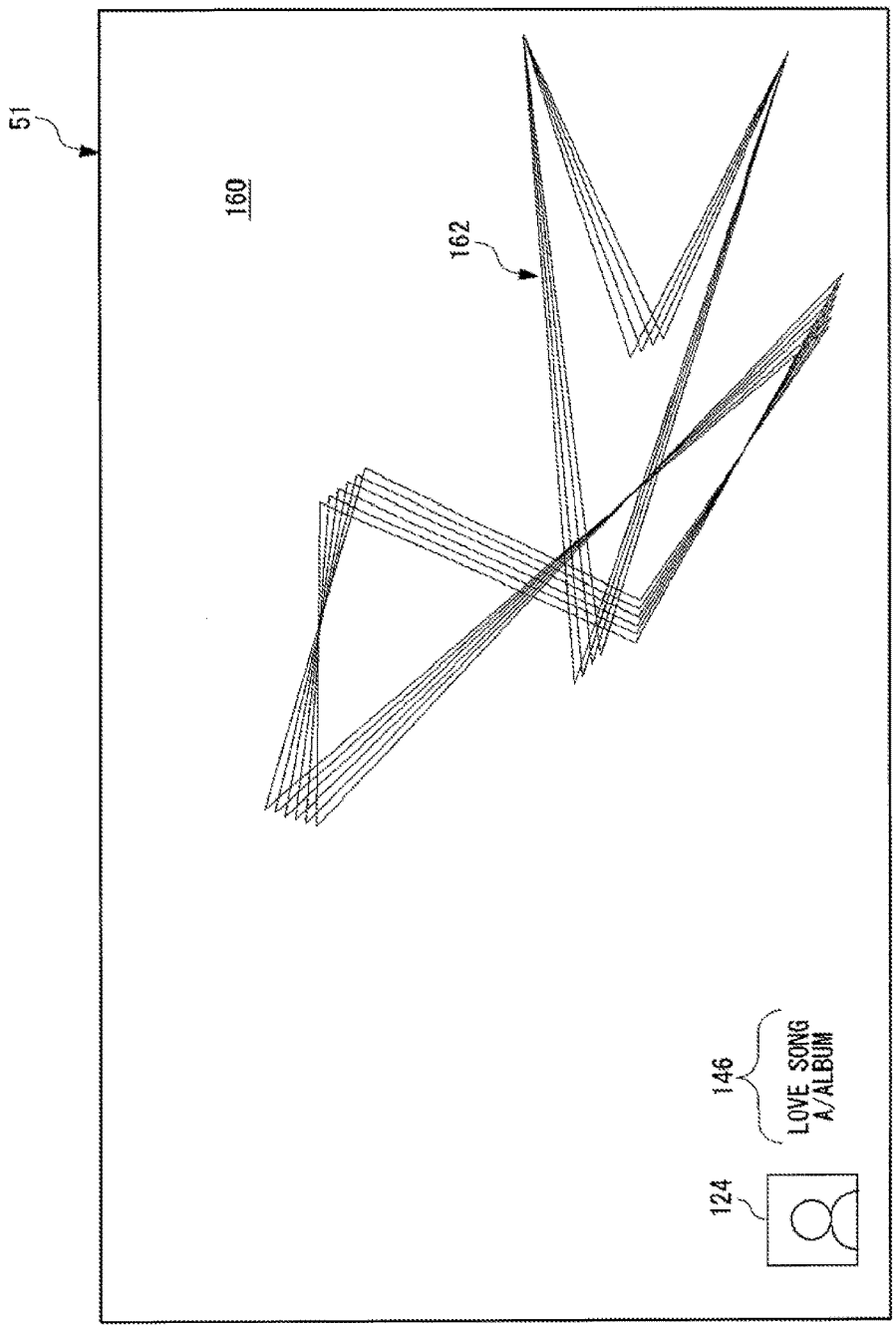
FIG. 6 is a diagram that schematically shows changes in the screen made upon selection of a content item.

FIG. 6 schematically shows a change in the screen made upon selection of a content item. When the menu screen 50 shifts to a content playing screen 51, the background generating unit 112 hides the function icon array 70, folder icon array 72 and content icon array 78, but continues to display the decorative object 162, which has been displayed on the menu screen 50, also on the content playing screen 51. This appears as a seamless shift from the menu screen to the content playing screen. Accordingly, the user may hardly perceive discontinuity between the screens and can consequently concentrate on the content item being played. The background generating unit 112 displays the content icon 124 of the selected content item in the bottom left corner of the content playing screen 51, and also displays, to the right thereof, information 146 on the selected content item. Once the content playing is started, the background generating unit 112 operates the decorative object 162 in the background area 160 according to parameters obtained from the output feature values of the content being played, etc.

When the operation unit 40 receives the decision of content playing from the user, the background generating unit 112 changes the background image during the change from the menu screen 50 to the content playing screen 51, using an image with which a visual effect can be obtained as if the user were moving toward the back or returning toward the front in the three-dimensional space from the user's point of view. For example, the size of the decorative object 162 may be changed by multiplying the control parameter of the object by a factor, or operation may be provided with which an effect is obtained as if the background image moved toward the back or the front. These effects make the user feel as if the user were moving toward the back or the front within the virtual three-dimensional space, thereby helping the user concentrate on the content.

Also, the background generating unit 112 may extract the color tone of the content icon 124 corresponding to the content item that the user has decided to play. Then, the color of the decorative object 162 or background object, both of which constitute the background image, may be adjusted so that its color tone becomes similar to the extracted color tone. In that case, since the color tone is reflected in the background image with respect to each content, the continuity can be obtained between the atmosphere of the menu screen 50 and that of the content playing screen 51, especially when a thumbnail of a frame of a moving image content is used for a content icon. Accordingly, even with the switching from a menu screen to a content playing screen, the user can concentrate on the content.

Further, the background generating unit 112 may change the color tone of the decorative object 162 or background object constituting the background image, at a time when the operation unit 40 receives the decision of playing from the user.

The background generating unit 112 may transform the decorative object 162 during content playing according to the output feature values of the content or button operation on the controller 42 provided by the user. For example, when a music content or a moving image content is played, the decorative object 162 may be transformed using the spectrum of the audio data as a parameter. Alternatively, the control parameter of the decorative object 162 may be changed according to button operation from the user, such as "OK", "cancel" and "move". Thus, by using the same decorative object on a menu screen and a content playing screen, the continuity can be obtained between the atmosphere of both the screens. Accordingly, even with the switching from a menu screen to a content playing screen, the user can concentrate on the content.

Figure 7:
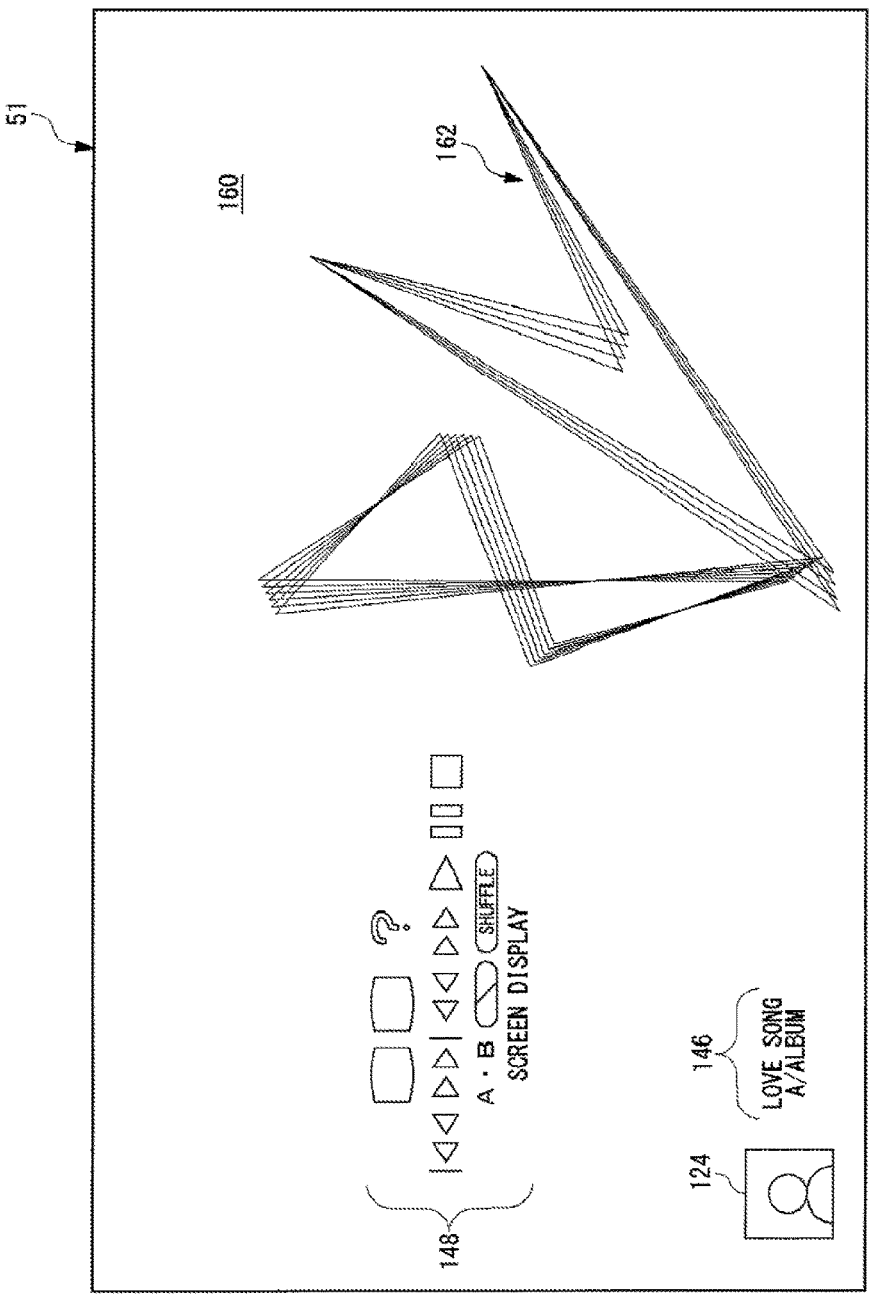
FIG. 7 is another diagram that schematically shows changes in the screen made upon selection of a content item.

When the operation unit 40 receives the user's instruction as to the displaying of the control panel during content playing, the playing screen generating unit 96 fades in an operation panel image 148 for making operation, such as playing, stopping, pausing, fast-forwarding and rewinding of the content, on the content playing screen 51 (see FIG. 7). A method of fading in is the same as stated previously. Also during such operation, the decorative object 162 continues to move in accordance with the control parameter.

When the user instructs the invoking of the menu screen via the operation unit 40 during content playing, the menu screen is superimposed and displayed upon the screen that has been provided during the content playing. On the menu screen displayed there is re-created the state that appeared when the content playing was decided.

Figure 8:
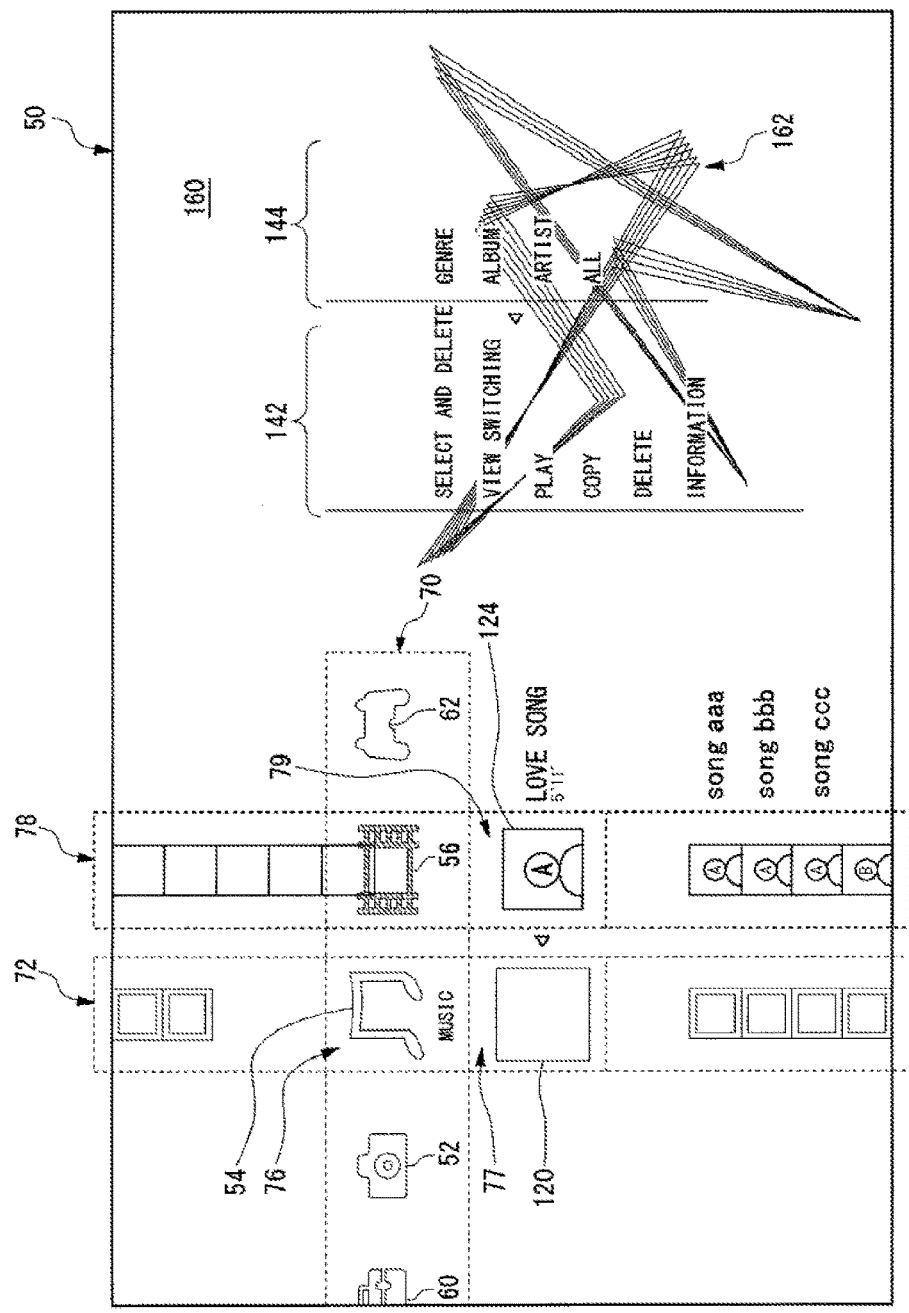
FIG. 8 is yet another diagram that schematically shows how the items on the menu screen change.

FIG. 8 schematically shows the state in which an option menu is displayed according to the user's instruction. When the operation unit 40 receives the user's instruction as to the displaying of an option menu, the menu screen generating unit 110 generates an option menu 142. The effect processing unit 108 then displays the option menu 142 fading in on the menu screen 50. By fading in the option menu 142, in which items are arranged longitudinally, blurred image of the option menu 142 is gradually made clear. In other words, the intensity of a filter applied to the images is gradually reduced with time. Also, if the option menu 142 is an object configured by mapping textures onto polygons, the Z values of the polygons may be manipulated. By gradually increasing or decreasing the Z values of the polygons from the initial values, the option menu 142 will be displayed in such a manner as to move downward or upward from the front or back of the screen vertical axis to the level where the menu screen is defined. Also, by gradually increasing the α values of the textures from the initial values, the option menu 142 may be displayed in a manner such that the transparent menu becomes opaque gradually. Further, the option menu 142 may be displayed in such a manner as to move from the right or left edge of the screen to the right of the folder icon array 72. The display methods stated above may be used in combination.

In such occasion, the effect processing unit 108 displays the icons included in the function icon array 70, folder icon array 72 and content icon array 78, with images acquired by applying a certain filter for making images indistinctive, instead of icons or images displayed before the displaying of the option menu 142. Such filter gives an effect of, for example, reducing the size of images, displaying images lighter by decreasing the luminance values of pixels, or making images blurred and unfocused. These effects may be used in combination. If such function icons, folder icons and folder attachment images are objects configured by mapping textures onto polygons, the objects may be made semi-transparent by decreasing the α values of the textures or may be moved toward the back of the screen vertical axis by manipulating the Z values, without applying a filter.

When the operation unit 40 receives the user's instruction as to the selection of one of the items displayed in the option menu 142, the menu screen generating unit 110 generates a second option menu 144. The effect processing unit 108 displays, to the right of the option menu 142, the second option menu 144 fading in on the menu screen 50 so that the blurred menu gradually becomes clear. In such occasion, the effect processing unit 108 displays the icons included in the function icon array 70, folder icon array 72 and content icon array 78, with images acquired by applying a certain filter for making images indistinctive, instead of icons or images displayed before the displaying of the second option menu 144.

The option menu 142 and second option menu 144 are presented as on-screen displays superimposed upon a content image or a background image. The effect processing unit 108 may color the whole area of the option menu 142 and second option menu 144 or may adjust the brightness of the content image, so that the menus can be easily distinguished from the background image in appearance.

Thus, when a folder or an option menu of a lower hierarchy level is displayed, icons that have been displayed before then are displayed smaller or less clearly to be less distinctive. In other words, icons less associated with the current operation will be displayed in such a manner as to move toward the back of the screen vertical axis in the virtual three-dimensional space on the screen. Conversely, icons of a higher hierarchy level will be displayed larger and more clearly.

When "view switching" in the option menu 142 is selected, the view with which contents are related to folder icons is changed. In FIG. 8, the content icon positioned in the second attention area 79 is music data, so that the four views of "genre", "album", "artist" and "all" are shown in the second option menu 144. If the content icon positioned in the second attention area 79 is photo data, for example, the views of "month", "year", "album", "alphabetical order" and "all" may be displayed in the second option menu 144.

FIG. 9 is a diagram that shows an example of content items and views. In the present specification, a folder icon functions as a unit for displaying content items that are adaptable to a given content playing function. Also, a view represents a category or an aspect of a content item.

In a table 150, a content column 152 shows the names of content items of music data (i.e. song data). Also, a genre column 154, an artist column 156, an album column 158, and a recording year column 159 shows the genres, artists, albums, and recording years of the content items shown in the content column 152, respectively. In this case, the "genre", "artist" or "album" corresponds to the "view". Accordingly, when the genre view is selected, the menu management unit 104 relates content items to the respective folder icons that are categorized into different genres. Specifically, the content items "aaa", "bbb" and "eee" are related to the "J-POP" folder icon, and the content items "fff", "ggg" and "hhh" are related to the "Country" folder icon. These folder icons are displayed in the folder icon array 72, as shown in FIG. 3, on the menu screen 50. When a different view, the album view, for example, is selected by the user, the menu management unit 104 relates the content items to the respective folder icons that are categorized into different albums. For example, the content items "fff", "ggg" and "hhh" are related to the "ζ" folder icon this time. Accordingly, in this case, the folder icons "α", "β", "γ", "δ", "ε" and "ζ" are displayed in the folder icon array 72, as shown in FIG. 3, on the menu screen 50. Also, when the artist view is selected by the user, the menu management unit 104 relates the content items to the respective folder icons that are categorized into different artists. For example, the content items "ggg" and "hhh" are related to the "F" folder icon this time. The same principal will be applied also in the case of the recording year view. Thus, the same content items "fff", "ggg" and "hhh" may be related to a common folder icon or different folder icons, depending on the view.

It should be noted that, depending on the type of the content playing function, there is a case where there exists only one content related to a folder icon. For example, if the optical disk 36 only storing one portion of image data is inserted to the multimedia player 20, only one folder icon will be displayed below the moving image icon 56. Further, if such folder icon is located in the attention area, there will be displayed only one content icon positioned in the second attention area 79.

Also, it should be noted in the present specification that the classification of content items related to folder icons is irrelevant to the places where the content items are stored. The menu management unit 104 searches the storage unit 80, external devices 37 and 39, optical disk 36, etc. for contents before relating each content item to a folder icon in accordance with the view being selected at the time.

The kinds of the view are not limited to those stated above. For example, "genre" or "photographer" may be defined as a view for folder icons to which photo contents or moving image contents are related. Also, recording month or year may be defined as a view for folder icons to which music contents are related.

Although a case has been described with reference to FIGS. 3-9 in which the music icon 54 is selected as the function icon, the process is the same also in a case where another function icon is selected.

Figure 10:
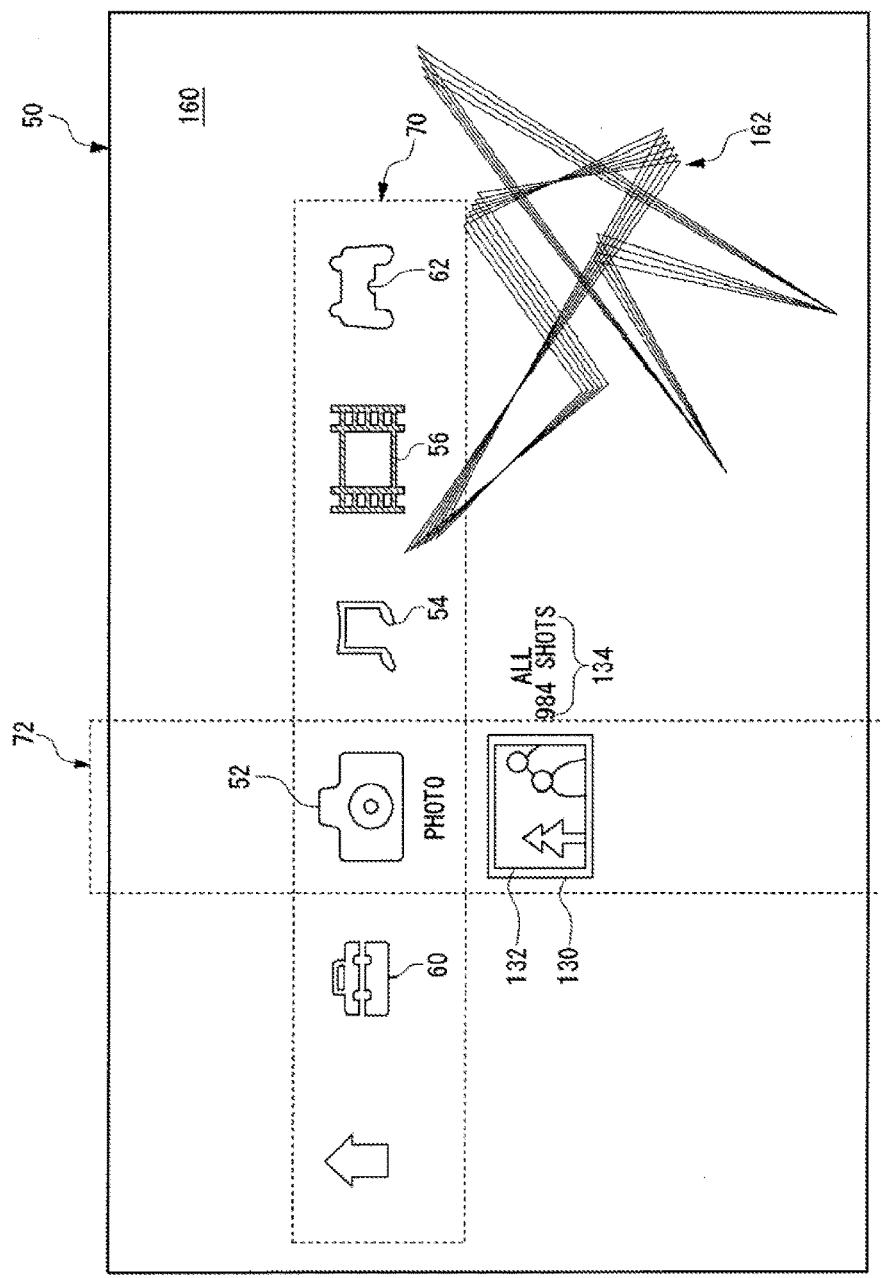
FIG. 10 is a diagram that schematically shows how the items on a menu screen change in another embodiment.

FIG. 10 schematically shows a menu screen in which the photo icon 52 is selected in the function icon array 70 and moved to the intersection area 76. The photo icon 52 is highlighted, and, below the icon, a folder icon 130 and a folder attachment image 132 are superposed and displayed. The folder attachment image 132 is a thumbnail of any photo data related to the folder icon 130. Unlike the folder icon 120 of square shape shown in FIGS. 3-5, the folder icon 130 is a horizontally oriented rectangle provided based on a thumbnail of photo data. To the right of the folder icon 130, the view and the number of data pieces are displayed as folder information 134. In FIG. 10, "all" is selected for the view, so that all pieces of photo data are related to the single folder icon 130. Accordingly, only the single folder icon 130 is displayed as the folder icon array 72.

Figure 11:
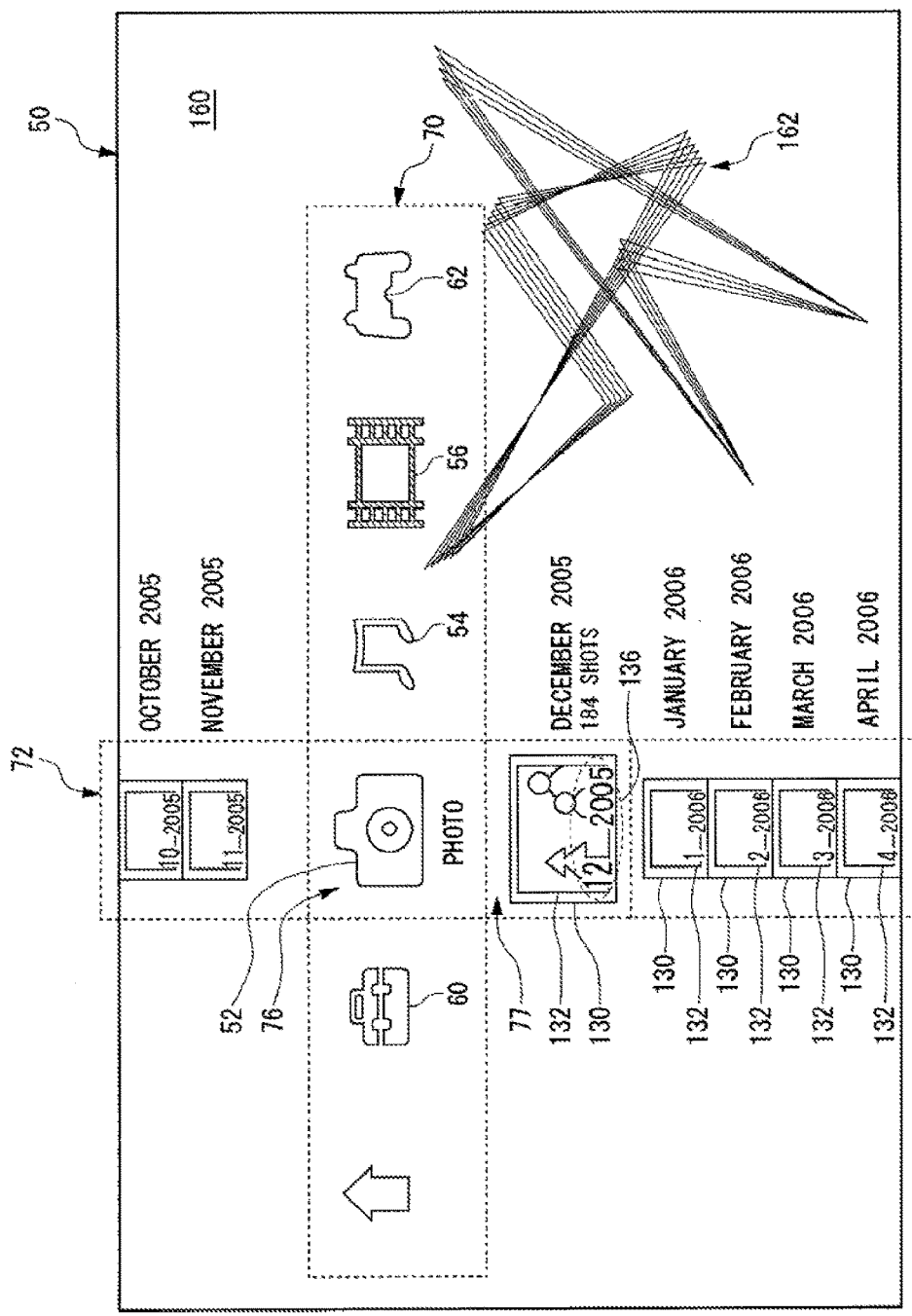
FIG. 11 is another diagram that schematically shows how the items on the menu screen change in the another embodiment.

FIG. 11 schematically shows how the menu screen shown in FIG. 10 changes. When the operation unit 40 receives the user's instruction as to view switching, the menu management unit 104 classifies content items according to the switched view and relates the content items to multiple folder icons 130. In FIG. 11, "month" is selected for the view, so that the menu screen generating unit 110 arranges, above and below the intersection area 76, the multiple folder icons 130 to which classified content items are related according to the capture months, so as to create the folder icon array 72. Then, one content icon is selected from among content icons of content items related to a folder icon 130, and the content icon is superimposed and displayed as the folder attachment image 132 with the folder icon 130. The folder icon 130 and folder attachment image 132 positioned in the attention area 77 are highlighted, and, to the right thereof, the view and the number of data pieces are displayed as the folder information 134. The view information, i.e. capture months, are also displayed to the right of the other folder icons 130.

Also, textual information 136 regarding the view may be superimposed and displayed with the folder icons 130. For example, upon the folder icon 130 in the attention area 77, the view information "12 2005" is displayed by the menu screen generating unit 110. Accordingly, the user can easily recognize the characteristics of contents related to the folder icons 130.

Figure 12:
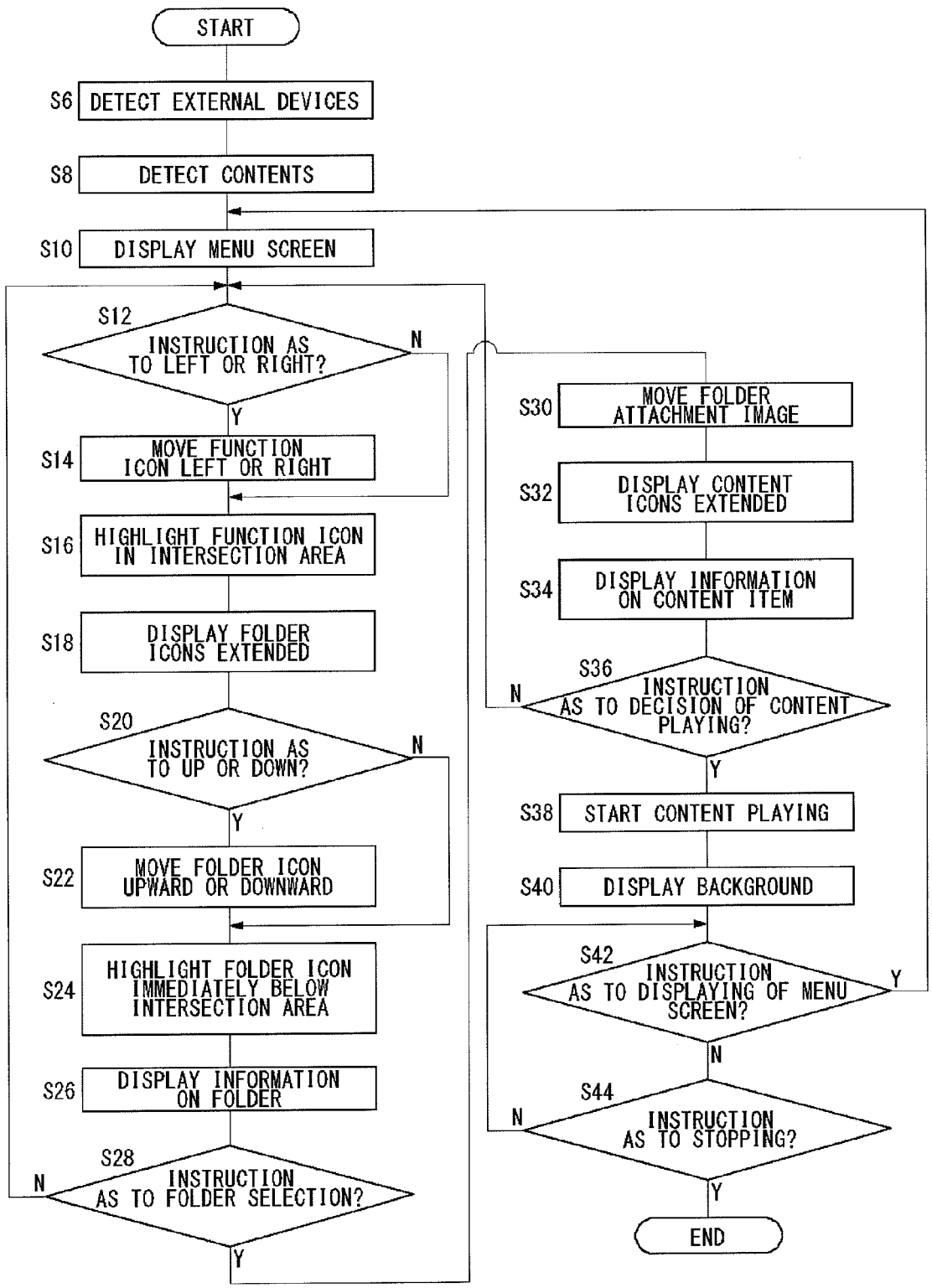
FIG. 12 is a flowchart that shows the operational process of the multimedia player.

FIG. 12 is a flowchart that shows the operational process of the multimedia player. When the user powers on the multimedia player 20, the network control unit 86 detects external devices on the LAN 35 via the network cable 34 (S6) and detects content items in the external devices and the storage unit 80 (S8). The menu screen generating unit 110 then receives items including function icons and content icons from the storage unit 80 to generate a menu screen, and the display output unit 46 displays the menu screen on the television set 30 (S10). If the operation unit 40 receives the user's instruction as to the direction of left or right (Y at S12), the effect processing unit 108 will move the function icons left or right according to the instruction (S14). Then, the effect processing unit 108 will highlight the function icon located in the intersection area 76 (S16) and will receive, from the storage unit 80 or an external device, folder icons and folder attachment images for the playing function to display the icons and images in a manner such that they extend upward and downward (S18). If there is no user's instruction as to the lateral direction, S14 will be skipped (N at S12).

If the operation unit 40 receives the user's instruction as to the direction of up or down (Y at S20), the effect processing unit 108 will move the folder icons upward or downward according to the instruction (S22). Then, the effect processing unit 108 will highlight the folder icon and folder attachment image located in the attention area 77 positioned immediately below the intersection area 76 (S24) and will display information 140 on the folder to the right of the folder icon (S26). If there is no user's instruction as to the longitudinal direction, S22 will be skipped (N at S20).

If the operation unit 40 receives the user's instruction as to folder selection (Y at S28), the effect processing unit 108 will move the folder attachment image out of the folder icon to the right according to the instruction (S30). Then, the effect processing unit 108 will display content icons of content items related to the selected folder in a manner such that they extend upward and downward (S32). Further, the effect processing unit 108 will highlight the content icon located in the second attention area 79 and will display information 140 on the content item to the right of the content icon (S34). The process of S12 through S26 is repeated until the user's instruction as to folder selection is received (N at S28).

The process of S12 through S34 is repeated until the operation unit 40 receives the user's instruction as to the decision of content playing (N at S36). When the operation unit 40 receives the instruction as to the decision of content playing (Y at S36), the content control unit 106 starts the playing of the content highlighted in the attention area 77 (S38). Also, when the menu screen shifts to a content playing screen, the background generating unit 112 provides display with which a visual effect is obtained as if the user were moving toward the back from the user's point of view (S40). If the operation unit 40 receives the user's instruction as to the invoking of the menu screen during content playing (Y at S42), the process will jump back to S10 so that the process of S10 through S40 will be performed again. If there is no user's instruction as to the invoking of the menu screen, the content playing will be continued (N at S42). Then, if the operation unit 40 receives the user's instruction as to the stopping of the content playing, the content control unit 106 will stop the content playing (Y at S44).

As described above, the multimedia player 20 of the present embodiment displays on the menu screen 50 a menu image consisting of an array of playing functions and an array of folder icons. Although the function icon array 70 or folder icon array 72 actually displayed is one row or one column, other folder icons or content icons adaptable to different playing functions will be subsequently displayed by scrolling up, down, left or right. This makes the user feel as if a number of contents were arranged as a matrix on the entire screen. The user can select a content, feeling as if the user manipulated the matrix, in which a number of contents are arranged, to bring a desired content into focus. Moreover, since few icons are displayed on the screen in actual, the user will be never given the impression that the operation is complicated.

Also, when a folder icon is selected, there can be seen the movement such that a folder attachment image superposed and displayed is extracted from the folder icon. This makes the user feel as if the user were removing a disk from a CD or DVD case in the real world.

When the user selects a folder icon or the displaying of an option menu, icons not being selected are transformed to images that are visually indistinctive and displayed on the menu screen. Accordingly, the user can easily recognize on the menu screen the hierarchy level or operation currently selected. Also, when a folder icon is selected or when an option menu is displayed, items other than the folder icon or option menu are displayed smaller and unfocused on the menu screen. Accordingly, the user can perceive the depth in the direction of the screen vertical axis and obtain the feeling of making menu operation within the virtual three-dimensional space.

Further, since content items related to folder icons can be easily changed by view switching, the user can search for a content item that the user wishes to play from various aspects. Accordingly, more prompt and less stressful searches can be achieved.

Given above is an explanation based on the exemplary embodiment. The embodiment is intended to be illustrative only and it will be obvious to those skilled in the art that various modifications to constituting elements or processes could be developed and that such modifications also fall within the scope of the present invention. Hereinbelow, some modifications will be described.

In the embodiment, the menu screen is configured so that the intersection area 76 is located immediately above the attention area 77. As a modification thereof, the menu screen may be configured so that, for example, the intersection area 76 is located immediately below or on the periphery of the attention area 77, as long as it provides an arrangement with which a user can easily check a function icon while paying attention to an attention icon.

In the embodiment, the menu screen 50 is configured so that the function icon array 70 and the folder icon array 72 are displayed horizontally and vertically, respectively. In a modification, the function icon array 70 and folder icon array 72 may be arranged utilizing the depth of the screen. For example, the function icon array 70 and folder icon array 72 may be arranged in such a manner as to be attached on a spherical surface virtually provided in the screen. Then, the icons in the arrays may be configured to rotate along with the spherical surface according to the user's instruction as to the direction of up, down, left or right. Alternatively, the icon positioned in the attention area may be displayed nearest the front along the screen vertical axis, so that icons other than that are displayed in the back of the screen vertical axis. Accordingly, the icon moved to the attention area according to the user's instruction as to the direction of up, down, left or right will be displayed in such a manner as to pop up frontward. If the display mode of giving depth to the function icon array 70 or folder icon array 72 is combined with the display mode of displaying items other than the selected icon smaller and unfocused, a user will be more instilled with the feeling of making menu operation within the virtual three-dimensional space.

The multimedia player 20 of the embodiment is configured so that the intersection area 76 and attention area 77 are located near the center of the menu screen 50. In a modification, the positions where the intersection area 76 and attention area 77 are displayed may be freely determined by a user.

The multimedia player 20 of the embodiment displays a menu screen for providing instructions as to content playing, on the television set 30 externally connected. As a modification thereof, the multimedia player may be a portable multifunction device that comprises a display integrated with the player. Also, the multimedia player may be implemented by a personal computer executing computer programs for providing various functions described in the embodiment.

INDUSTRIAL APPLICABILITY

The present invention provides to users an intuitive user interface in a multimedia player.

The invention claimed is:
1. An apparatus for displaying a menu screen on a contents playing apparatus, comprising:
 a storage unit configured to store data of function icons each representing a function operable on the contents playing apparatus, data of content icons each representing items of the contents, and data of folder icons each including at least one content icon;
 a display control unit configured to retrieve the data of function icons, content icons and folder icons from the storage unit, and to generate image data for the menu screen which includes a plurality of function icons, a plurality of content icons, and at least one folder icon;
 a display output unit configured to output the image data for the menu screen to the contents playing apparatus; and
 an operation unit configured to receive instructions from a user for selecting one of the function icons, the content icons, or the at least one folder icon displayed in the menu screen,
 wherein the display control unit superimposes one or more of the content icons of contents included in a corresponding folder over the folder icon and displays the folder icon and other content icon not included in the folder and/or other folder icon in a same first array, and
 when the folder icon is selected by the user via the operation unit, the display control unit
  displays the one or more content icons included in the folder corresponding to the folder icon adjacent to the folder icon in a different second array parallel to the first array and extracts and moves the selected folder icon to an attention area on the first array adjacent a corresponding one of the function icons that are displayed on a third array perpendicular to the first and second arrays.

2. The apparatus of claim 1, wherein the display control unit displays the content icons arrayed in a first area of the menu screen.

3. The apparatus of claim 2, wherein the display control unit displays the function icons arrayed in a second area different from the first area of the menu screen.

4. The apparatus of claim 1, wherein the folder icons are semi-transparent.

5. The apparatus of claim 1, wherein, when displaying the content icons included in the folder icons adjacent to the folder icons, the display control unit hides the content icons which have been superimposed over the folder icon.

6. The apparatus of claim 1, wherein the display control unit displays an array of the content icons included in the folder icon in a third area adjacent to the folder icon, and when the number of contents included in the folder corresponding to the folder icon is more than a predetermined value, the display control unit scroll-displays the array of the content icons in the third area in response to the user's instruction via the operation unit.

7. The apparatus of claim 6, wherein when displaying the array of the content icons included in the folder icons in the third area adjacent to the folder icons, the display control unit highlights the folder icons and the content icons in the third area compared to the remaining icons.

8. The apparatus of claim 7, wherein the display control unit highlights the folder icons and the content icons in the third area with brightness different from brightness of the other displayed icons.

9. The apparatus of claim 1, wherein the display control unit further displays common attribute type in the content icons included in the folder icon as a folder information adjacent to the folder icon.

10. A method for displaying a menu screen on a contents playing apparatus, comprising:
retrieving data of function icons each representing a function operable on the contents playing apparatus, data of content icons each representing items of the contents, and data of folder icons each including at least one content icon from a memory;
generating image data for the menu screen which includes a plurality of function icons, a plurality of content icons, and at least one folder icon;
outputting the image data for the menu screen to the contents playing apparatus; and
receiving instructions from a user for selecting one of the function icons, the content icons, or the at least one folder icon displayed in the menu screen,
superimposing one or more of the content icons of contents included in a corresponding folder over the folder icon,
displaying the folder icon and other content icons not included in the folder and/or other folder icon in a same first array, and
when the folder icon is selected by the user via an operation unit,
displaying the one or more content icons included in the folder corresponding to the folder icon adjacent to the folder icon in a different second array parallel to the first array and
extracting and moving the selected folder icon to an attention area on the first array adjacent a corresponding one of the function icons that are displayed on a third array perpendicular to the first and second arrays.

11. A system comprising:
a contents playing apparatus; and
a menu screen displaying apparatus, the menu screen displaying apparatus comprising:
a storage unit configured to store data of function icons each representing a function operable on the contents playing apparatus, data of content icons each representing items of the contents, and data of folder icons each including at least one content icon;
a display control unit configured to retrieve the data of function icons, content icons and folder icons from the storage unit, and to generate image data for a menu screen which includes a plurality of function icons, a plurality of content icons, and at least one folder icon;
a display output unit configured to output the image data for the menu screen to the contents playing apparatus; and
an operation unit configured to receive instructions from a user for selecting one of the function icons, the content icons, or the at least one folder icon displayed in the menu screen,
wherein the display control unit superimposes one or more of the content icons of contents included in a corresponding folder over the folder icon and displays the folder icon and other content icon not included in the folder and/or other folder icon in a same first array, and
when the folder icon is selected by the user via the operation unit, the display control unit
displays the one or more content icons included in the folder corresponding to the folder icon adjacent to the folder icon in a different second array parallel to the first array and
extracts and moves the selected folder icon to an attention area on the first array adjacent a corresponding one of the function icons that are displayed on a third array perpendicular to the first and second arrays.

* * * * *